Patented June 23, 1931

1,811,360

UNITED STATES PATENT OFFICE

WILLIAM T. LITTLE, OF WESTFIELD, NEW JERSEY

PROCESS FOR RECOVERY OF TIN FROM STANNATE SOLUTIONS

No Drawing. Application filed November 1, 1928. Serial No. 316,623.

This invention relates to recovering tin; and it comprises a method of recovering tin from lead alloys containing the same wherein molten lead is treated in a known way with a molten mixture of caustic soda and sodium nitrate (or nitrite), the saline composition resulting is leached with cold water to dissolve sodium stannate and the stannate solution treated with nitrous gases to precipitate tin oxid and reconstitute sodium nitrate and nitrite, the nitrite and nitrate going back into the process; all as more fully hereinafter set forth and as claimed.

In the Harriss process, now in extensive use for recovering pure lead and other metals from plumbiferous junk metals, base-bullion, etc., the metal is melted and the molten metal put in circulation by a pump, molten metal in its passage going through a floating molten body of a mixture of caustic soda and sodium nitrate. This mixture serves to oxidize and forms saline combinations with such tin, arsenic and antimony as may be present. The Harriss method is an efficient way of producing pure lead and separating and recovering such other values as may be present in the impure metal. When the oxidizing power of the floating cover is exhausted, it is removed and treated by various processes for the recovery of the contained tin, antimony and arsenic. In recovering tin, it is usual to extract the cold saline mixture with cold water which dissolves sodium stannate and leaves behind undissolved sodium antimonate and hydrated sodium arsenate. These are recovered by other operations. The sodium stannate solution produced in this extraction contains relatively large amounts of caustic soda and sodium carbonate. In the art the solution is customarily electrolyzed to recover metallic tin. As the tin plates out, the soda with which it has been combined is set free as caustic soda and the caustic alkali content of the solution thus increases, with a fall in current efficiency. When the current efficiency becomes too low its is usual to discontinue electrolysis and evaporate down the bath to recover anhydrous NaOH to go back to the lead purifying step, but inasmuch as the solutions are exposed to the air the carbonate of soda content is augmented and intermediate causticization is necessary in making caustic soda for return in the process.

I have found that a better mode of operation and certain economies are afforded by treating the sodium stannate solution in a different way, recovering sodium nitrate for return to the Harriss process in lieu of caustic soda. In this invention I treat the solution of sodium stannate made as described with nitrous gases in amount sufficient for neutralization. Nitrous gases for the present purposes may be defined as those resulting from commercial processes of oxidizing ammonia by air or oxygen in the presence of catalysts. Similar nitrous gases may also be obtained in other ways as by the reduction of nitric acid incident to a number of commercial processes, as in oxidizing $As_2O_3$ to $As_2O_5$. These nitrous gases contain various oxids of nitrogen in varying proportions.

The nitrous gases convert all the sodium content of the bath into sodium nitrite and nitrate in varying proportions and tin is thrown out as tin oxid in a form relatively easy to separate, wash and handle. It may be removed by filtration or otherwise and converted into tin, if this be desired by any ordinary method. If the solution is completely neutralized by the nitrous gases, no causticization is necessary, all $CO_2$ being expelled. The neutralized liquid can be evaporated until sodium nitrate crystals are produced; an operation much less expensive than the evaporation of caustic soda solutions. The sodium nitrate may be returned directly to the Harriss process.

The nitrous gases may be simply bubbled through the stannate solution or the gases may be contacted with the liquid in any other convenient way.

In a specific embodiment of my invention, a sodium stannate solution produced as described was treated with nitrous gases until the tin was completely precipitated. The solution thus treated originally analyzed as follows: soda as NaOH, 118.4 grams per liter, free NaOH, 48 grams per liter, tin, 67.5 grams per liter and arsenic 2.4 grams per liter. This solution was contacted with nitrous gases until the alkalinity was substantially neutralized. This threw the tin out of solution as hydrated tin oxid in a form which was readily filtrable. The sodium nitrate solution obtained by filtration and washing of the cake was evaporated and sodium nitrate crystallized out. This nitrate solution was free of carbonate since the $CO_2$ present in the alkaline solution was displaced by the nitrous gases.

The tin oxid was sufficiently pure for commercial purposes and from it tin was readily recovered by the usual methods.

In my copending application Ser. No. 310,931, filed Oct. 6, 1928, I have disclosed processes of precipitating tin oxid from alkaline solutions of sodium stannate by treating such solutions with nitrous gases. In that application, such processes are specifically used in conjunction with processes of recovering tin in which the detinning is effected by the action of an alkaline solution containing dissolved nitrous gases. In the present application, such processes for precipitating the tin oxid are somewhat modified and used in conjunction with recovering tin by processes involving detinning by means of a molten mixture of caustic soda and sodium nitrate. In my present process sodium nitrate is recovered as such and is added or reintroduced into the molten bath used for detinning.

What I claim is:—

In the detinning of lead alloys containing tin by the action of a molten mixture of caustic soda and sodium nitrate, the process of producing sodium nitrate therefor and of recovering tin which comprises cooling said mixture after use, extracting with cold water to produce a solution of sodium stannate, treating said solution of sodium stannate with gaseous oxids of nitrogen to precipitate tin oxid and form sodium nitrate, separating the tin oxid from the solution of sodium nitrate thus obtained, recovering said sodium nitrate from said solution and adding said sodium nitrate thus obtained to said molten mixture of caustic soda and sodium nitrate.

In testimony whereof I affix my signature.

WILLIAM T. LITTLE.